(12) United States Patent
Shankar et al.

(10) Patent No.: US 8,195,702 B2
(45) Date of Patent: Jun. 5, 2012

(54) ONLINE INDEX BUILDS AND REBUILDS WITHOUT BLOCKING LOCKS

(75) Inventors: Shrikanth Shankar, San Francisco, CA (US); Ramesh Kumar, Foster City, CA (US); Krishna Kunchithapadam, Portland, OR (US); Ananth Raghavan, San Francisco, CA (US); Dheeraj Pandey, Santa Clara, CA (US); Amit Ganesh, San Jose, CA (US); Joy M. Forsythe, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 686 days.

(21) Appl. No.: 11/830,545

(22) Filed: Jul. 30, 2007

(65) Prior Publication Data
US 2009/0037366 A1    Feb. 5, 2009

(51) Int. Cl.
*G06F 17/30* (2006.01)
(52) U.S. Cl. ........ 707/796; 707/792; 707/793; 707/794; 707/795; 707/797; 707/798; 707/799; 707/800; 707/801; 707/802; 707/809; 707/812
(58) Field of Classification Search .................. 707/202, 707/792, 793, 794, 795, 796, 797, 798, 799, 707/800, 801, 802, 809, 812, 999.101, 999.102, 707/999.103, 999.107
See application file for complete search history.

(56) References Cited

U.S. PATENT DOCUMENTS

| | | | | |
|---|---|---|---|---|
| 5,706,509 | A * | 1/1998 | Man-Hak Tso | 707/201 |
| 6,338,056 | B1 * | 1/2002 | Dessloch et al. | 707/2 |
| 6,363,228 | B1 * | 3/2002 | Ream | 399/66 |
| 6,438,562 | B1 * | 8/2002 | Gupta et al. | 707/201 |
| 6,882,993 | B1 * | 4/2005 | Lawande et al. | 707/2 |
| 7,031,974 | B1 * | 4/2006 | Subramaniam | 707/102 |
| 2001/0044807 | A1 * | 11/2001 | Kleiman et al. | 707/203 |
| 2005/0144202 | A1 * | 6/2005 | Chen | 707/205 |
| 2005/0289186 | A1 * | 12/2005 | Guo et al. | 707/200 |
| 2006/0080345 | A1 * | 4/2006 | Murthy et al. | 707/100 |
| 2008/0235296 | A1 * | 9/2008 | He et al. | 707/202 |
| 2009/0012980 | A1 * | 1/2009 | Stefani et al. | 707/101 |

OTHER PUBLICATIONS

S. Srivathsani, "Online Indexing in SQL Server 2005" downloaded Sep. 14, 2007 from the Internet < http://www.sql-server-performance.com/articles/per/online_indexing_2005_p1.aspx > 3 pages.
"Managing Indexes" downloaded Sep. 14, 2007 from the Internet < http://oracle1on1.oracle.com/docs/cd/B10510_01/server.920/a96521/indexes.htm > pp. 11 and 12.

* cited by examiner

*Primary Examiner* — Syling Yen
(74) *Attorney, Agent, or Firm* — Hickman Palermo Truong Becker Bingham Wong LLP; Daniel D. Ledesma (57) ABSTRACT

Techniques are provided for processing a CREATE INDEX statement that avoids one or more locks on the underlying table. The processing of such a statement may be divided into a build phase and a cooperation phase. During the build phase, a journal table is created and published. A snapshot of the table is obtained after the last DML transaction (that was pending at the time the journal table was published) commits. The index is built based on the state of the table as of the snapshot. Any changes to the table while the index is built are recorded in the journal table. During the cooperation phase, the index is partially published. A subsequent DML statement determines whether any changes in the journal table affect the same data as the subsequent DML statement. If so, then those changes are applied to the index followed by the subsequent DML statement.

22 Claims, 6 Drawing Sheets

ONLINE INDEX BUILDS AND REBUILDS WITHOUT BLOCKING LOCKS

RELATED APPLICATION

This application is related to U.S. application Ser. No. 11/830,538, filed on Jul. 30, 2007, entitled AVOIDING LOCK CONTENTION BY USING A WAIT FOR COMPLETION MECHANISM, the contents of which are incorporated by reference as if fully set forth herein.

FIELD OF THE INVENTION

The present invention relates to databases, and more particularly to avoiding locks on data when building an index from a table.

BACKGROUND

In database systems, many resources (such as data blocks, tables, indexes) are shared among multiple processes. Even though resources may be shared, many resources may not be used by more than one process at a given time. For example, sometimes, tables stored on a storage medium may be concurrently accessed in some ways (e.g., read) by multiple processes, but accessed in other ways (e.g., written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks from being granted on the same resource.

Types of Locks

There are numerous types of locks that may be granted with respect to a particular resource. One type of lock is a shared (S) lock. An S lock on a table grants a process permission to read the table and guarantees that other processes cannot write to the table; however, the S lock does not guarantee that other processes cannot read the table.

Another type of lock is an exclusive (X) lock. An X lock on a table grants a process permission to read from and write to a table and guarantees that other processes cannot read from or write to the table.

Another type of lock is a shared-exclusive (SX) lock. An SX lock on a table grants multiple processes permission to read from and write to the table, but prevents S locks and X locks from being granted on the table. A common scenario in which a SX lock is used is when multiple processes are affecting different rows of the same table.

Types of Database Statements

There are at least two types of database statements which, when executed, require locks on certain database objects: data manipulation language (DML) statements and data definition language (DDL) statements. Non-limiting examples of DML statements include INSERT, UPDATE, and DELETE. Non-limiting examples of DDL statements include CREATE, DROP, and ALTER. DML statements modify entries (e.g., rows) in tables and indexes while DDL statements define a table or index, such as by adding a column or dropping a partition.

Multiple DML statements are usually included in a single database transaction. The processing of a database statement typically entails parsing (or compiling) the database statement and then executing the database statement. One or more processes that parse and/or execute a database statement acquire locks while the database statement is processed.

Although a database transaction is simply a transaction and, thus, does not perform any function in and of itself, the discussion hereinafter says, for purposes of brevity, that a database transaction (or a database statement) performs some function relative to a lock. For example, "a database transaction acquires a lock" is shorthand for "one or more processes that process a database transaction acquire a lock." Similarly, "a database statement acquires a lock" is shorthand for "one or more processes that process a DML statement acquire a lock."

Online Index Builds

In high traffic database systems, it is important to allow multiple DML statements to update a single table concurrently. However, if locks were granted to DML statements on a per-table basis, then only one DML statement would be able to access a table at any instant. Mechanisms have therefore been developed for allowing multiple DML statements to update a single table. DML statements may obtain locks at the granularity of a single row of a table in order to allow other DML statements to acquire locks on other rows of the table concurrently.

However, some DDL statements require a lock on an entire table. One such DDL statement is the CREATE INDEX statement which, when executed, causes an index to be built from one or more tables. For the sake of brevity, reference is made hereinafter to a single table from which an index is built. Once issued, a CREATE INDEX statement waits for any DML statements that currently hold locks on individual rows of the table to complete before the CREATE INDEX statement begins. Once the table lock is acquired, any DML statements that require a lock on individual rows of the same table must wait until the CREATE INDEX statement completes.

Figure 1:
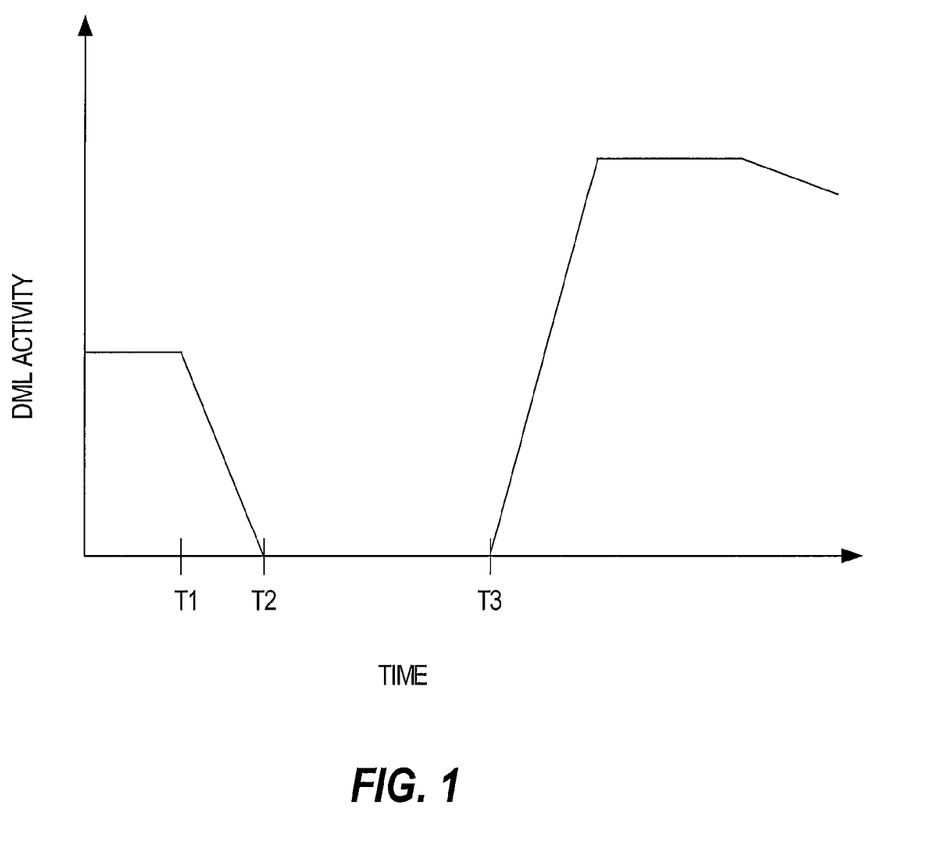
FIG. 1 is a graph that illustrates the effect on DML activity that CREATE INDEX statements have when issued.

FIG. 1 is a graph that illustrates the effect on DML activity that CREATE INDEX statements have when issued. At T1, a CREATE INDEX statement is issued. Subsequently, the CREATE INDEX statement must wait until any DML statements that hold locks on any row of the pertinent table to complete. Also, any DML statements (1) that are issued after the CREATE INDEX statement and (2) that require a lock on any row of the table must wait until the CREATE INDEX statement is executed and releases its lock.

By T2, all DML statements that were issued before the CREATE INDEX statement have completed. Also at T2, the CREATE INDEX statement begins executing. As part of its execution, the CREATE INDEX statement acquires a lock on the table. At T3, the CREATE INDEX statement completes and releases the lock on the table. The period between T3 and T4 indicates an increase in DML activity above the "normal" threshold in order to process the DML statements that were blocked on the CREATE INDEX statement.

In high traffic websites that are supported by one or more underlying database systems, the "dip" (i.e., between T1 and T3) in DML activity is unacceptable because the "dip" indicates that some users are waiting longer for transactions to complete than such user normally would wait. Thus, overall user experience suffers, which may result in some users choosing to visit other websites. Furthermore, a database system may not have enough resources to process the backlogged DML statements in addition to the DML statements that are received in the normal course of business, which may cause additional delays in processing the DML statements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, CREATE INDEX statements may be processed without blocking any DML transactions. After a CREATE INDEX statement is issued (e.g., by an administrator), a database server creates a log (referred to hereinafter as a "journal table") and publishes the journal table. DML statements that are issued subsequent to the publishing of the journal table log their respective changes to the journal table. The database server creates a snapshot of the table, from which an index is to be generated, when the last DML transaction, which was pending when the journal table was published, commits. After the snapshot is created, the database server deletes the journal table and builds the index. While the index is built, any DML transactions that modify the table and that have committed since the snapshot was created are recorded in the journal table.

After the index is built from table as of the snapshot, the journal table may have multiple DML transactions recorded therein. Instead of the CREATE INDEX statement acquiring a lock on the table to block subsequent DML statements from being processed, subsequent DML statements determine whether any DML statements recorded in the journal table affect the same data blocks as the subsequent DML statements. If so, then the recorded DML statements are deleted from the journal table. Once the journal table is drained of all DML statements, the index is made available to subsequent DML statements.

Database Transactions

A database statement is executed in the context of a database transaction. When a database transaction completes (i.e., commits), any changes to database objects and/or metadata of the database objects are made visible to other database server processes.

Multiple DML statements are usually included in a single database transaction, whereas a database transaction that includes a DDL statement usually includes no other types of database statements. A database transaction that includes one or more DML statements is referred to hereinafter as a "DML transaction." A database transaction that includes a CREATE INDEX statement is referred to hereinafter as a "CREATE INDEX transaction."

One Approach for an Online Index Build

Figure 2A:
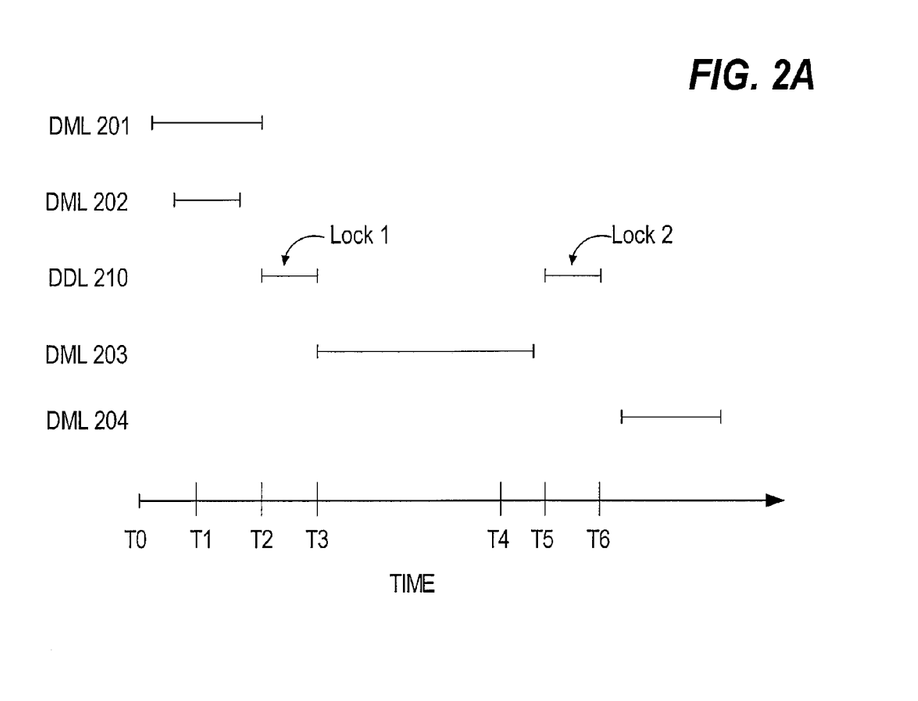
FIG. 2A is a diagram that illustrates an approach for processing a CREATE INDEX statement.

One approach for decreasing the time that multiple DML statements are blocked while a CREATE INDEX statement is executed is for the CREATE INDEX statement to acquire two locks (at different times) on the table from which the index is generated. FIG. 2A is a diagram that illustrates an approach for processing CREATE INDEX statements. In FIG. 2A, four DML transactions (DML 201-204) and one CREATE INDEX statement (DDL 210) are illustrated. The lines indicating the start and end of each DML transaction indicate the processing of the corresponding DML statement, and not necessarily when the corresponding DML statement was issued. Also, each DML statement is part of its own database transaction. The lines associated with DDL 210 indicate certain events that may occur while processing the CREATE INDEX statement.

In FIG. 2A, DML 201 and DML 202 are issued before T1. At T1, a CREATE INDEX statement is issued (e.g., by a database administrator). In response to receiving the CREATE INDEX statement, a journal table is created and published. A published journal table informs DML statements that a CREATE INDEX statement is concurrently being processed. Such concurrent DML statements log their respective changes to the journal table. To be "published" means DML statements are aware of the journal table and, thus, update the journal table with their respective changes. To be relevant, the index should be continuously updated to reflect the current state of the underlying table. Thus, the journal table is used to record the changes made by DML statements while the index is being built. Hereinafter, reference to changes being recorded in a journal table is equivalent to DML statements being recorded in a journal table.

Instead of locking a table during the entire build of an index, a CREATE INDEX statement obtains a snapshot of the table. The snapshot indicates a particular state of the table. The index is built from this particular state of the table. To ensure that the journal table includes only DML statements that are committed after the snapshot, a CREATE TABLE statement acquires a (e.g., S) lock on the table.

Referring back to FIG. 2A, because DML 201 and DML 202 may hold locks that are incompatible with a lock that the CREATE INDEX statement is requesting, DDL 210 may be blocked (i.e., may be required to wait) until T2 to resume execution. At T2, DDL 210 acquires a lock on the table. Thus, "Lock 1" of FIG. 2A indicates a period in which DDL 210 holds a lock on the table. Between T2 and T3, DDL 210 obtains a snapshot of the table and any entries in the journal table are deleted. Any changes to the table before the snapshot do not need to be recorded in the journal table because such changes are reflected in the snapshot.

During the period indicated by lock 1, all database transactions that require incompatible locks (e.g., X or SX locks) on the table are blocked on DDL 210 (i.e., all DML statements must wait until DDL 210 releases its lock on the table). For example, DML 203 may have been issued shortly after T2 but must wait until T3 to be parsed and executed.

At T3, DML 201 releases its lock on the table. The process of building the index may begin. Thus, between T3 and T4, an index is built based on the state of the table reflected in the snapshot. All changes to the table while the index is being built are recorded in the journal table, such as the changes caused by DML 203.

Any changes recorded in the journal table are used to update the index. While the index is being updated with DML statements recorded in the journal table, additional DML statements may be issued and recorded in the journal table. Eventually, at T4, the CREATE INDEX statement acquires a lock on the table to prevent any further DML statements (e.g., DML 204) from affecting the table while the index is built based on DML statements that are recorded in the journal table. By processing a CREATE INDEX statement in this way, only two short-lived locks are acquired on a table. Thus, concurrently executing DML transactions are blocked for less time than in previous implementations that acquire a single lock for the entire duration of processing a CREATE INDEX statement.

DML Activity

Figure 2B:
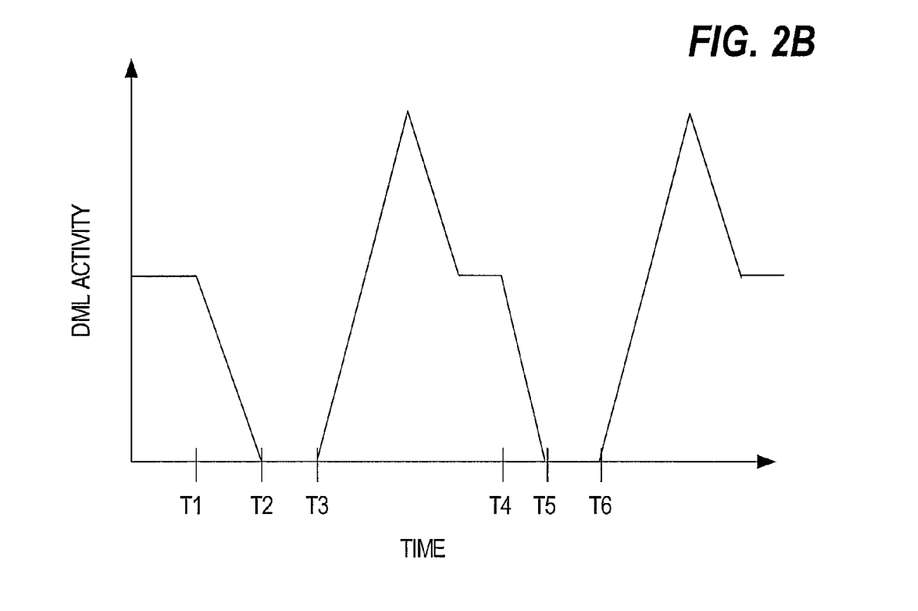
FIG. 2B is a diagram that illustrates the approach's possible effect on DML activity with respect to the table from which the index is built.

To illustrate, FIG. 2B is a diagram that illustrates the effect that the above approach has on DML activity with respect to the table from which the index is built. In both FIGS. 1 and 2B, the time between T1 and T3 is the time that "unsafe transactions" are blocked. An unsafe transaction is a transaction that is pending at the time the journal table is published. The time between T1 and T3 in FIG. 1 is much longer than the cumulative times between T1 and T3 and between T3 and T5 in FIG. 2B because DML transactions in FIG. 1 are blocked also during the entire index build phase.

Building an Index Online without Blocking Locks

Figure 3A:
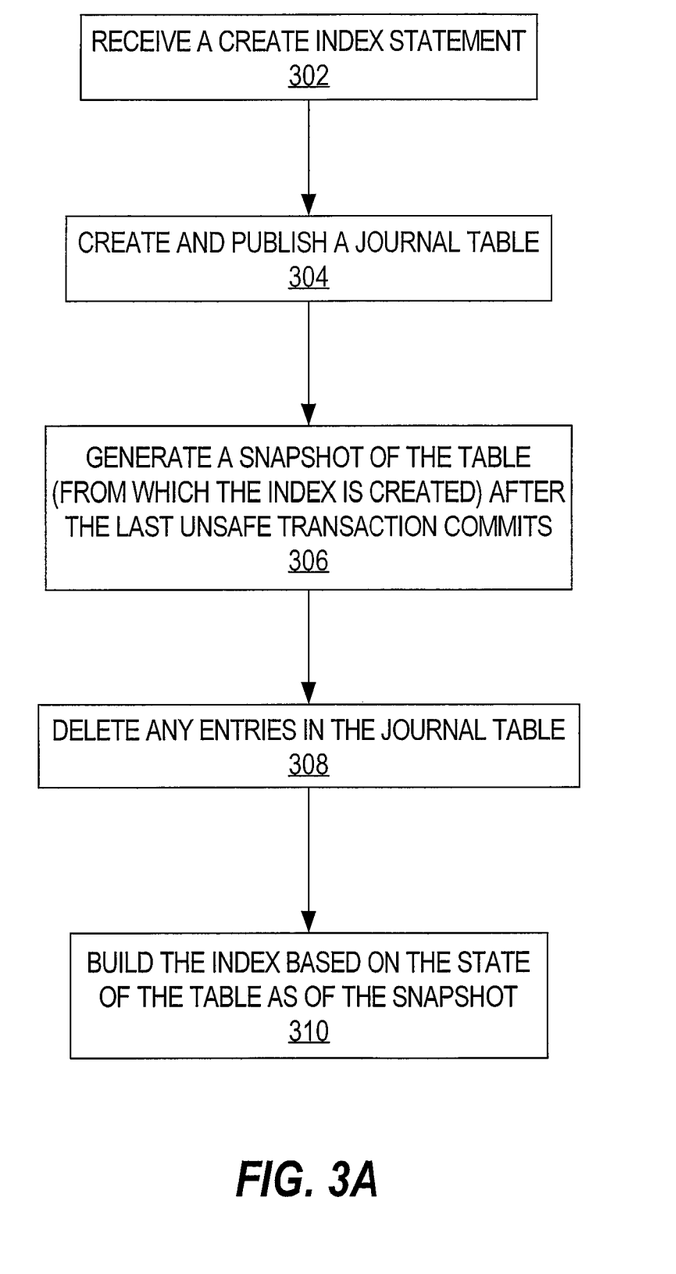
FIG. 3A is a flow diagram that illustrates a build phase for processing a CREATE INDEX statement, according to an embodiment of the invention.
Figure 3B:
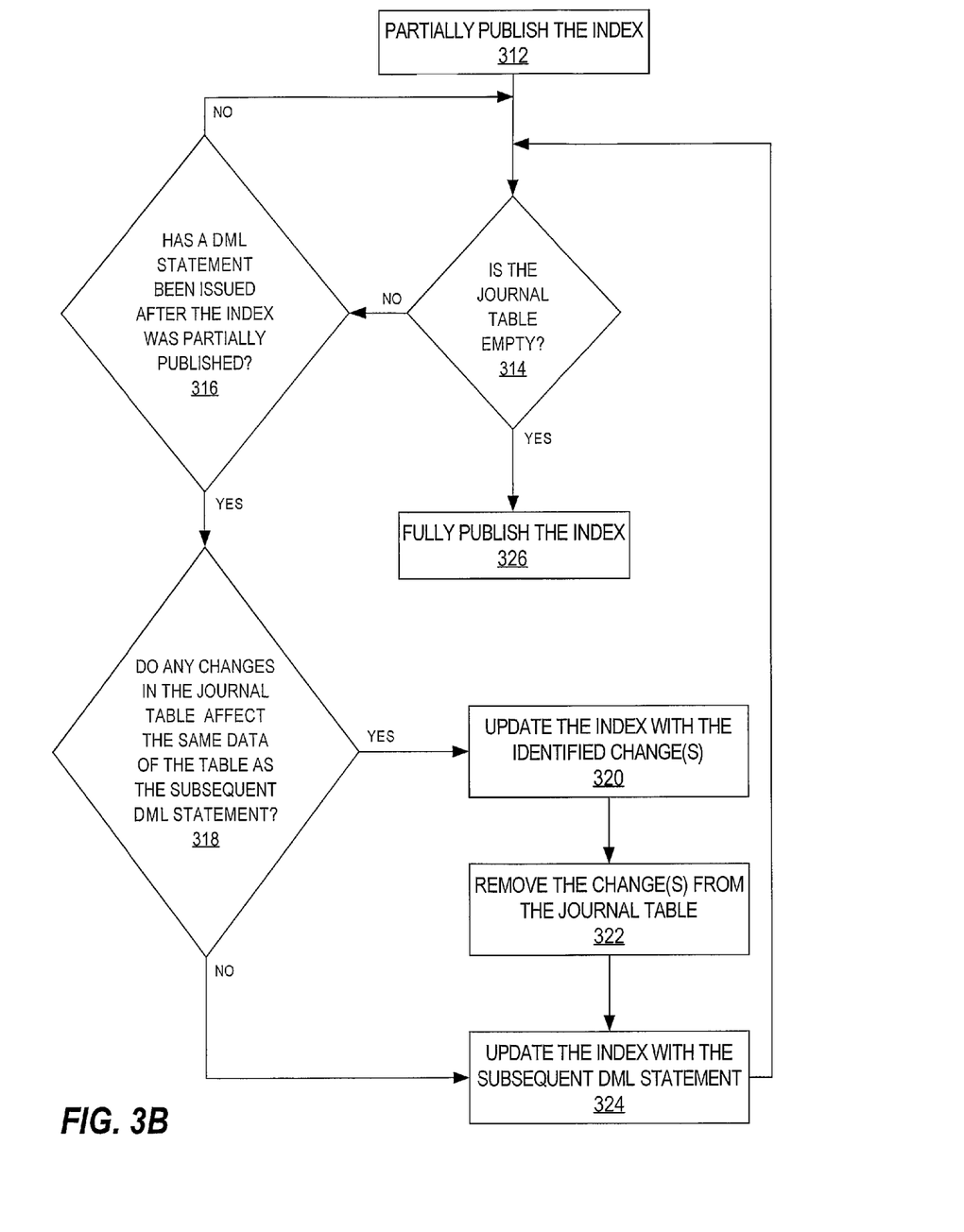
FIG. 3B is a flow diagram that illustrates a cooperation phase for processing a CREATE INDEX statement, according to an embodiment of the invention.

According to an embodiment of the invention, an index is built online without using any blocking locks. In this way, DML activity on the table may be unaffected while a CREATE INDEX statement is processed. FIGS. 3A-B are flow diagrams that illustrate an approach for processing a CREATE INDEX statement, according to an embodiment of the invention. A CREATE INDEX statement may be processed in two phases—a build phase and a cooperation phase. In one embodiment of the invention, both phases are implemented. In another embodiment of the invention, only one of the phases is implemented.

Build Phase

Referring to FIG. 3A, at step 302, a CREATE INDEX statement is received.

In an embodiment, the CREATE INDEX statement acquires a lock on the table, but in a mode that is compatible with locks on the table that DML statements acquire. For example, the lock on the table may be a sub-shared (SS) lock, which does not prevent SX locks from being acquired (by DML statements) on the table.

At step 304, a journal table is created and published. A journal table records DML statements that specify changes to the table. To be "published" means DML statements are aware of the journal table and, thus, update the journal table with their respective changes. Alternatively, actual DML statements may be recorded in the journal. For purposes of brevity, the discussion hereinafter says that changes that are applied to a database object are recorded in the journal table rather than the corresponding DML statement being recorded in the journal table. To be relevant, the index should be continuously updated to reflect the current state of the underlying table. Thus, the journal table is used to record changes to the table while the index is being built. In one embodiment, any changes to the table that will not be reflected in the index are recorded in the journal table but later deleted when the changes are determined to be irrelevant. In a related embodiment, DML statements are configured to not log their respective changes to the journal table if the changes are irrelevant with respect to the index.

Instead of locking a table to obtain a snapshot of the table (as the above approach requires), a CREATE INDEX statement waits until all DML transactions that were pending at the time the journal table was published have committed. Such DML transactions are referred to hereinafter as "unsafe transactions." Any unsafe transactions may not have seen the published journal table. Thus, the changes of the DML statements that correspond to the unsafe transactions may not have been recorded in the journal table.

At step 306, a snapshot of the table is obtained when the last unsafe transaction has committed. Any DML statements that are issued after the publishing of the journal table will be recorded in the journal table.

At step 308, the entries in the journal table are deleted. These entries refer to DML statements whose changes are already reflected in the table as of the snapshot. Thus, such changes do not need to be recorded in the journal table.

At step 310, the index is built based on the state of the table as of the snapshot. Step 310 marks the end of the build phase.

In one embodiment, the index is updated with the changes recorded in the journal table according to the approach described above. Thus, in one pass of scanning the journal table, the index is updated with the changes recorded therein. After each pass, additional DML statements, whose changes are recorded in the journal table, may have been issued. Eventually, a lock is acquired on the table. This lock blocks further DML statements from executing. Once the lock is acquired, the changes recorded in the journal table are used to update the index. After the journal table is empty, the index is published and the lock is released.

Cooperation Phase

According to one embodiment of the invention, a cooperation phase of processing a CREATE INDEX statement is entered without ever entering a build phase. Thus, in this embodiment, the CREATE INDEX statement acquires a lock on the table before a snapshot of the table is created. According to another embodiment of the invention, the processing proceeds from the build phase (as described previously) to a cooperation phase, which is described below.

In either embodiment, at step 312 of FIG. 3B, the index is "partially" published. To be "partially" published means that DML statements are allowed to see the index; however, database statements (including DML statements) are not allowed to use the index. During the cooperation phase, DML statements that are issued after the index is partially published and before the journal table is empty maintain the index directly. Such DML statements are referred to hereinafter as "subsequent DML statements." This process of subsequent DML statements maintaining the index directly ensures that no subsequent DML statement is recorded in the journal table, which guarantees convergence.

At step 314, it is determined whether the journal table is empty, i.e., no changes are recorded in the journal table. If not, then the process proceeds to step 316.

At step 316, it is determined whether a subsequent DML statement has been issued. When a DML statement is compiled, the compiler determines whether a journal table exists. If so, then information indicating the existence of the journal table is saved for use at execution time. If so, then the process proceeds to step 318.

At step 318, the subsequent DML statement determines whether one or more changes that are recorded in the journal table affect at least some of the same data of the table as the subsequent DML statement. If so, then the process proceeds to step 320. If not, then the process proceeds to step 324.

At step 320, the one or more changes that are identified in step 318 are used to update the index. In an embodiment, such changes may be disregarded if the changes are completely nullified by the changes made by the subsequent DML statement. For example, a change recorded in the journal table might specify that any of the table's rows whose row identifier is greater than 100 are updated in one or more columns. A subsequent DML statement might delete any of the table's rows whose row identifier is greater than 90. In this situation, updating the index with the recorded change is not necessary. However, if the identified changes are not completely nullified by the changes made by the subsequent DML statement, then the identified changes, or at least those changes that are not superseded by the subsequent DML statement, are used to update the index.

At step 322, the identified changes are removed from the journal table, after which the process proceeds to step 324.

At step 324, the subsequent DML statement is used to update the index. The process then proceeds to step 314 to determine whether the journal table is empty. In one embodiment, however, if processing proceeded directly from step 318 to step 324, then the logic may "know" that no changes were deleted from the journal table and, thus, may skip the determination of step 314. The logic may cause one or more processes to "wait" for another DML statement to be issued.

In a related embodiment, if no DML statements are identified in step 318, then at least the "oldest" DML statement that is recorded in the journal table is used to update the index before (or after) the subsequent DML statement is used to update the index. In this way, at least one change may be removed from the journal table for each subsequent DML statement.

In a related embodiment, while subsequent DML statements are maintaining the index directly, concurrently executing processes may update the index with changes recorded in the journal table, for example, by beginning with the oldest changes that are recorded in the journal table first until the newest changes are removed from the journal table.

If, at step 314, it is determined that the journal table is empty, then the process proceeds to step 326, where the index is "fully" published, which marks the end of the cooperation phase and, thus, the end of execution of the CREATE INDEX statement. Once the index is fully published, subsequent queries (including DML statements) on the table may use the index to locate pertinent data efficiently.

Example

Figure 4A:
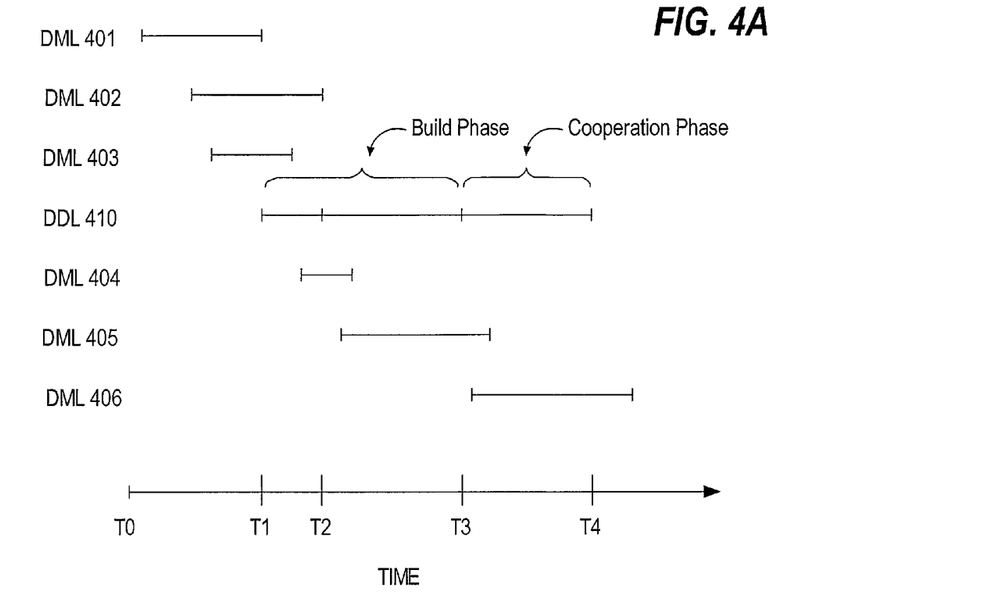
FIG. 4A is a diagram that illustrates a build phase and a cooperation phase approach for processing a CREATE INDEX statement in the context of concurrently executing DML statements, according to an embodiment of the invention.

FIG. 4A is a diagram that illustrates a build phase and a cooperation phase approach for processing a CREATE INDEX statement in the context of concurrently executing DML statements, according to an embodiment of the invention.

In FIG. 4A, six DML transactions (DML 401-406) and one CREATE INDEX statement (DDL 410) are illustrated. The lines indicating the start and end of each DML transaction indicate the processing of the corresponding DML statement(s), and not necessarily when the corresponding DML statement(s) was issued. Also, each DML statement is part of its own database transaction. The lines associated with DDL 410 indicate certain events that may occur while processing the CREATE INDEX statement.

In FIG. 4A, DML 401 and DML 402 are issued before T1. At T1, a CREATE INDEX statement is issued (e.g., by a database administrator). In response to receiving the CREATE INDEX statement, a journal table is generated and published. Even though DMLs 401-403 may hold locks on the table, DDL 410 is not blocked on DMLs 401-403. In this example, DMLs 402 and 403 are considered unsafe transactions.

At T2, the last unsafe transaction (i.e., DML 402) has committed. After DML 402 commits, DDL 410 obtains a snapshot of the table. Any changes recorded in the journal table are deleted.

After the snapshot is obtained, the process of building the index may begin. The changes specified by any DML statements that are issued while the index is being built are recorded in the journal table, such as DML 404.

Between T2 and T3, an index is built based on the state of the table reflected in the snapshot. Any changes recorded in the journal table are from DML statements that were executed after T2.

At T3, the index is finally built as of the state of the table reflected in the snapshot (i.e. T2). Also, the index is partially published, indicating that DML statements may see the index but that database statements (including DML statements) may not use the index to answer queries. T3 marks the end of the build phase.

At T3, the journal table may include changes from multiple DML statements and, thus, may need to be used to update the index. The time period between T3 and T4 corresponds to the cooperation phase.

After the above step(s), subsequent DML statements maintain the index. In FIG. 4A, subsequent DML statements in DML 405 that execute before T3 do not perform "cooperation", whereas subsequent DML statements in DML 405 that execute after T3 do perform cooperation. Also, any DML statements in DML 406 that execute before T4 also perform cooperation. The above process repeats for each subsequently executed DML statement until the journal table is fully "drained" of DML statements (i.e., the journal table is empty) at T4. The index is made fully available to all queries on the table, which marks the end of the cooperation phase and the end of processing the CREATE INDEX statement.

Figure 4B:
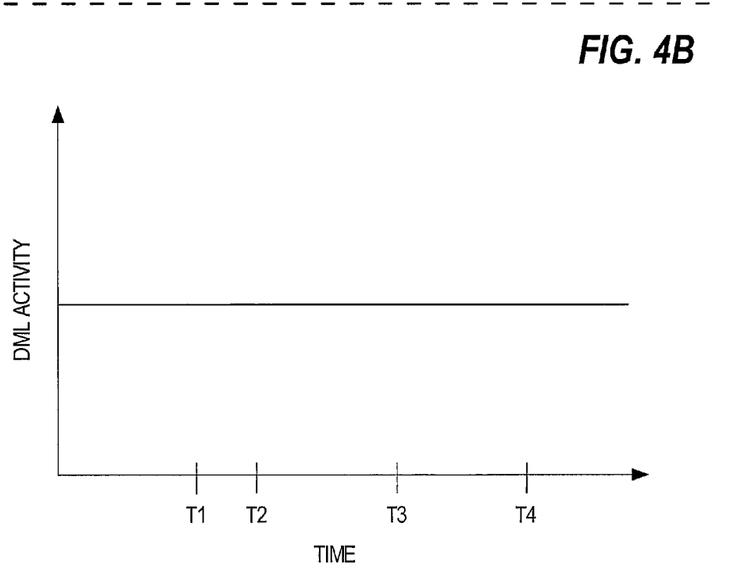
FIG. 4B is a diagram that illustrates how implementing a build phase and a cooperation phase may affect DML activity with respect to the table from which the index is built, according to an embodiment of the invention.

By processing a CREATE INDEX statement according to a build phase and a cooperation phase, as described above, the CREATE INDEX statement requires no blocking locks on a table. Thus, DML statements that are concurrently executing with respect to the CREATE INDEX statement are not blocked on the CREATE INDEX statement. To illustrate, FIG. 4B is a diagram that shows the effect that implementing both a build phase and a cooperation phase may have on DML activity with respect to a particular table, according to an embodiment of the invention. In contrast to FIGS. 1 and 2B, there is no change in DML activity in FIG. 4B because neither the build phase nor the cooperation phase require blocking locks on the table, which would have forced DML statements to wait until the CREATE INDEX statement completed.

In an embodiment, the same algorithm that applies to the initial build of an index applies to rebuilds of the index.

Hardware Overview

Figure 5:
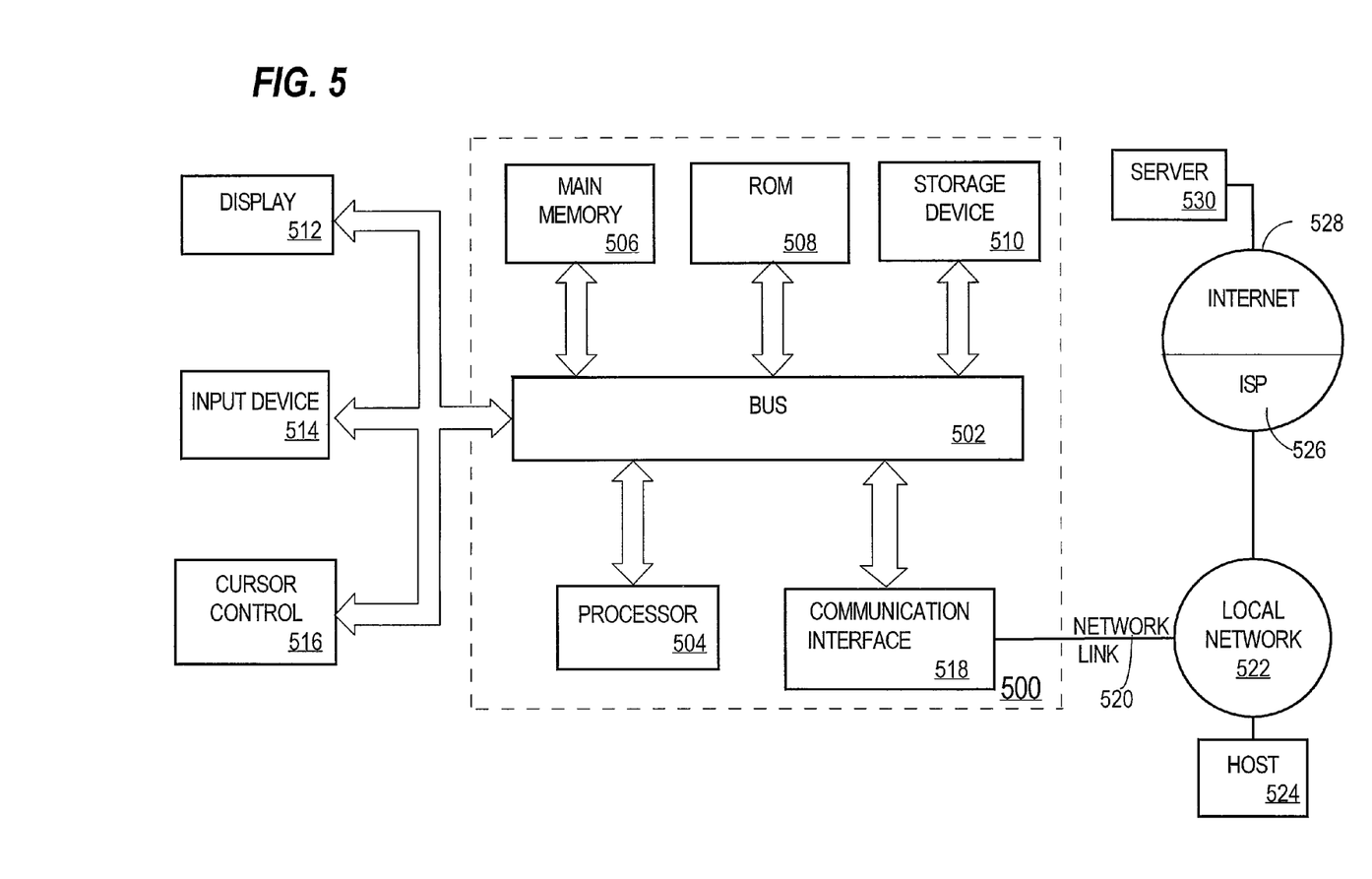
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
  receiving a database statement that requires a second data structure to be generated based on a first data structure;
  in response to receiving the database statement, generating the second data structure;
  while generating the second data structure, receiving a plurality of database statements that require a plurality of changes to be made to the first data structure;
  recording the plurality of changes in a third data structure;
  after the second data structure is generated, receiving a particular database statement that requires a particular change to the first data structure;
  determining whether one or more changes, of the plurality of changes recorded in the third data structure, would affect the same data in the second data structure that the particular change would affect if the particular change were applied to the second data structure;
  in response to determining that one or more changes, of the plurality of changes recorded in the third data structure, would affect the same data in the second data structure, removing the one or more changes the third data structure; and
  applying the particular change to the second data structure;
  wherein the method is performed by one or more computing devices.

2. The method of claim 1, further comprising, before generating the second data structure:
  generating the third data structure;
  after generating the third data structure, making the third data structure available to processes that execute other database statements; and
  after making the third data structure available to processes that execute other database statements, determining a state of the first data structure only after the last database transaction, that was pending when the third data structure was made available, commits;
  wherein generating the second data structure includes generating the second data structure based on the state of the first data structure.

3. The method of claim 2, further comprising:
  recording changes, that are made to the first data structure, in the third data structure before the state of the first data structure is determined; and
  in response to determining the state of the first data structure, deleting any changes that are recorded in the third data structure and that were made to the first data structure.

4. The method of claim 1, further comprising:
  before removing the one or more changes from further consideration, applying the one or more changes to the second data structure;
  wherein applying the particular change to the second data structure is performed after the one or more changes are applied to the second data structure.

5. The method of claim 1, further comprising deleting the one or more changes of the plurality of changes without applying the one or more changes to the second data structure.

6. A method comprising:
  receiving a database statement that, when processed, causes a second data structure to be generated based on a first data structure;
  in response to receiving the database statement the database statement, generating a third data structure;
  after generating the third data structure, making the third data structure available to processes that execute other database statements;
  after making the third data structure available to processes that execute other database statements, determining a state of the first data structure only after the last database transaction, that was pending when the third data structure was made available, commits; and
  after determining the state of the first data structure, generating the second data structure based on the state of the first data structure;
  wherein the method is performed by one or more computing devices.

7. The method of claim 6, wherein the third data structure records changes that are made to the first data structure.

8. The method of claim 6, further comprising:
  recording changes, that are made to the first data structure, in the third data structure before the state of the first data structure is determined; and
  in response to determining the state of the first data structure, deleting any changes in the third data structure.

9. The method of claim 6, further comprising:
  while generating the second data structure, receiving a plurality of database statements that require a plurality of changes to the first data structure;
  recording the plurality of changes in the third data structure;
  after the second data structure is generated, receiving a particular database statement that requires a particular change to the first data structure;
  in response to receiving the particular database statement, determining whether one or more changes, of the plurality of changes indicated in the third data structure, would affect the same data in the second data structure that the particular change would affect if applied to the second data structure;
  in response to determining that one or more changes, of the plurality of changes indicated in the third data structure, would affect the same data in the second data structure that the particular change would affect if applied to the second data structure, removing from the third data structure, the one or more changes from further consideration; and applying the particular change to the second data structure.

10. The method of claim 1, wherein:
the first data structure is a table;
the second data structure is an index on the table; and
the third data structure is a journal table.

11. The method of claim 6, wherein:
the first data structure is a table;
the second data structure is an index on the table; and
the third data structure is a journal table.

12. One or more storage media storing instructions which, when executed by one or more processors, cause:
receiving a database statement that requires a second data structure to be generated based on a first data structure;
in response to receiving the database statement, generating the second data structure;
while generating the second data structure, receiving a plurality of database statements that require a plurality of changes to be made to the first data structure;
recording the plurality of changes in a third data structure;
after the second data structure is generated, receiving a particular database statement that requires a particular change to the first data structure;
determining whether one or more changes, of the plurality of changes recorded in the third data structure, would affect the same data in the second data structure that the particular change would affect if the particular change were applied to the second data structure;
in response to determining that one or more changes, of the plurality of changes recorded in the third data structure, would affect the same data in the second data structure, removing the one or more changes the third data structure; and
applying the particular change to the second data structure.

13. The one or more storage media of claim 12, wherein:
the first data structure is a table;
the second data structure is an index on the table; and
the third data structure is a journal table.

14. The one or more storage media of claim 12, wherein the instructions, when executed by the one or more processors, further cause, before generating the second data structure:
generating the third data structure;
after generating the third data structure, making the third data structure available to processes that execute other database statements; and
after making the third data structure available to processes that execute other database statements,
determining a state of the first data structure only after the last database transaction, that was pending when the third data structure was made available, commits;
wherein generating the second data structure includes generating the second data structure based on the state of the first data structure.

15. The one or more storage media of claim 14, wherein the instructions, when executed by the one or more processors, further cause:
recording changes, that are made to the first data structure, in the third data structure before the state of the first data structure is determined; and
in response to determining the state of the first data structure, deleting any changes that are recorded in the third data structure and that were made to the first data structure.

16. The one or more storage media of claim 12, wherein the instructions, when executed by the one or more processors, further cause:
before removing the one or more changes from further consideration, applying the one or more changes to the second data structure;
wherein applying the particular change to the second data structure is performed after the one or more changes are applied to the second data structure.

17. The one or more storage media of claim 12, wherein the instructions, when executed by the one or more processors, further cause deleting the one or more changes of the plurality of changes without applying the one or more changes to the second data structure.

18. One or more storage media storing the instructions which, when executed by one or more processors, cause:
receiving a database statement that, when processed, causes a second data structure to be generated based on a first data structure;
in response to receiving the database statement the database statement, generating a third data structure;
after generating the third data structure, making the third data structure available to processes that execute other database statements;
after making the third data structure available to processes that execute other database statements, determining a state of the first data structure only after the last database transaction, that was pending when the third data structure was made available, commits; and
after determining the state of the first data structure, generating the second data structure based on the state of the first data structure.

19. The one or more storage media of claim 18, wherein:
the first data structure is a table;
the second data structure is an index on the table; and
the third data structure is a journal table.

20. The one or more storage media of claim 18, wherein the third data structure records changes that are made to the first data structure.

21. The one or more storage media of claim 18, wherein the instructions, when executed by the one or more processors, further cause:
recording changes, that are made to the first data structure, in the third data structure before the state of the first data structure is determined; and
in response to determining the state of the first data structure, deleting any changes in the third data structure.

22. The one or more storage media of claim 18, wherein the instructions, when executed by the one or more processors, further cause:
while generating the second data structure, receiving a plurality of database statements that require a plurality of changes to the first data structure;
recording the plurality of changes in the third data structure;
after the second data structure is generated, receiving a particular database statement that requires a particular change to the first data structure;
in response to receiving the particular database statement, determining whether one or more changes, of the plurality of changes indicated in the third data structure, would affect the same data in the second data structure that the particular change would affect if applied to the second data structure;

in response to determining that one or more changes, of the plurality of changes indicated in the third data structure, would affect the same data in the second data structure that the particular change would affect if applied to the second data structure, removing from the third data structure, the one or more changes from further consideration; and applying the particular change to the second data structure.

* * * * *

UNITED STATES PATENT AND TRADEMARK OFFICE
CERTIFICATE OF CORRECTION

| | |
|---|---|
| PATENT NO. | : 8,195,702 B2 |
| APPLICATION NO. | : 11/830545 |
| DATED | : June 5, 2012 |
| INVENTOR(S) | : Shankar et al. |

Page 1 of 1

It is certified that error appears in the above-identified patent and that said Letters Patent is hereby corrected as shown below:

In column 11, line 52, in Claim 1, after "changes" insert -- from --.

In column 13, line 36, in Claim 12, after "changes" insert -- from --.

Signed and Sealed this
Twenty-eighth Day of August, 2012

David J. Kappos
*Director of the United States Patent and Trademark Office*